United States Patent [19]
Workman

[11] 3,992,024
[45] Nov. 16, 1976

[54] TRIPODAL VEHICLE
[76] Inventor: John Workman, 232 E. Oak St., Ovid, Mich. 48866
[22] Filed: Nov. 20, 1975
[21] Appl. No.: 633,716

[52] U.S. Cl. ....................................... 280/87.02 W
[51] Int. Cl.² ................................................ B62B 7/00
[58] Field of Search ............. 280/87.02 W, 87.02 R; 272/70, 70.3

[56] References Cited
UNITED STATES PATENTS

| | | | |
|---|---|---|---|
| 2,423,590 | 7/1947 | Fageol | 280/87.02 R |
| 3,044,797 | 7/1962 | Borland | 280/87.02 W |
| 3,129,952 | 4/1964 | Rivers | 280/87.02 W |
| 3,532,356 | 10/1970 | Lillibridge | 280/87.02 W |

FOREIGN PATENTS OR APPLICATIONS

| | | | |
|---|---|---|---|
| 919,056 | 2/1963 | United Kingdom | 272/70.3 |

*Primary Examiner*—Philip Goodman
*Assistant Examiner*—R. Schrecengost
*Attorney, Agent, or Firm*—Ian C. McLeod

[57] ABSTRACT

A tripodal vehicle with a spider-like configuration for seated movement by the feet with a reduced tendency to tip over during movement is described. The vehicle has casters on each leg and is constructed such that the three legs have inverted, rounded uppermost leg portions with a seat mounted on a frame in the center of and supporting the legs such that the uppermost portion of the seat is level with or below the uppermost portion of the legs. This vehicle construction gives it a relatively low center of gravity which provides the stability. The vehicle can be used by children as a toy and by persons who are invalids but have the use of their legs.

5 Claims, 4 Drawing Figures

TRIPODAL VEHICLE

SUMMARY OF INVENTION

The present invention relates to a tripodal vehicle which is movable by the feet from a rest position in any direction in a level plane when a person is seated on the vehicle. In particular, the present invention relates to such a vehicle which because of its spider-like construction is stabilized against tipping during movement over a level plane.

PRIOR ART

Vehicles for movement by the feet while seated are well known and are used as infant strollers, toys and invalid carriers. Such vehicles usually have four aligned wheels spaced apart so that the vehicle does not tip over. In such wheeled vehicles, sideways movement is not possible without tipping over. For this reason, casters are used on such vehicles to provide freedom of movement.

For reasons of economy of construction and reduction of weight it would be desirable to provide a vehicle with casters in tripodal form so that there would be complete freedom of movement on a level plane. The problem has been that such three-legged vehicles easily tip over.

OBJECTS

It is therefore an object of the present invention to provide a tripodal vehicle with a spider-like configuration which moves in any direction in a level plane and which has a considerably reduced tendency to tip over in relation to prior art structures. It is further an object of the present invention to provide a light weight tripodal vehicle which is simple and economical to construct. These and other objects will become increasingly apparent by reference to the following description and the drawing.

IN THE DRAWING

GENERAL DESCRIPTION

The present invention generally relates to the tripodal vehicle which comprises: a frame mounting a seat and three spider-like legs such that the uppermost portion of the seat is level with or below the level of an inverted rounded uppermost portion of the legs when the vehicle is on a level plane; and casters mounted at the ends of the legs such that the vehicle is movable by the feet from a rest position in any direction on a level plane when a person is seated on the vehicle.

The present invention particularly relates to the tripodal vehicle which comprises a seat which provides seating when the vehicle is on a level plane, a frame member having two ends providing a place between the ends which mounts the seat; a single leg positioned at one end of the frame so as to provide an inverted rounded section such that the uppermost portion of the section is level with or above the uppermost level of the seat when the vehicle is on a level plane and provides a rigid spring action; an attachment means provided at the other end of the frame; handle bars connected to the attachment means with two rounded portions which are level with or above the uppermost level of the seat when the vehicle is on a level plane and with two legs which extend below the seat and at a small angle in front view to the single leg and away from the seat to a length which provides seating when the vehicle is on a level plane and which provide a rigid spring action; and casters mounted at the ends of the three legs such that the vehicle is movable by the feet from a rest position in any direction on a level plane when a person is seated on the vehicle.

SPECIFIC DESCRIPTION

Figure 1:
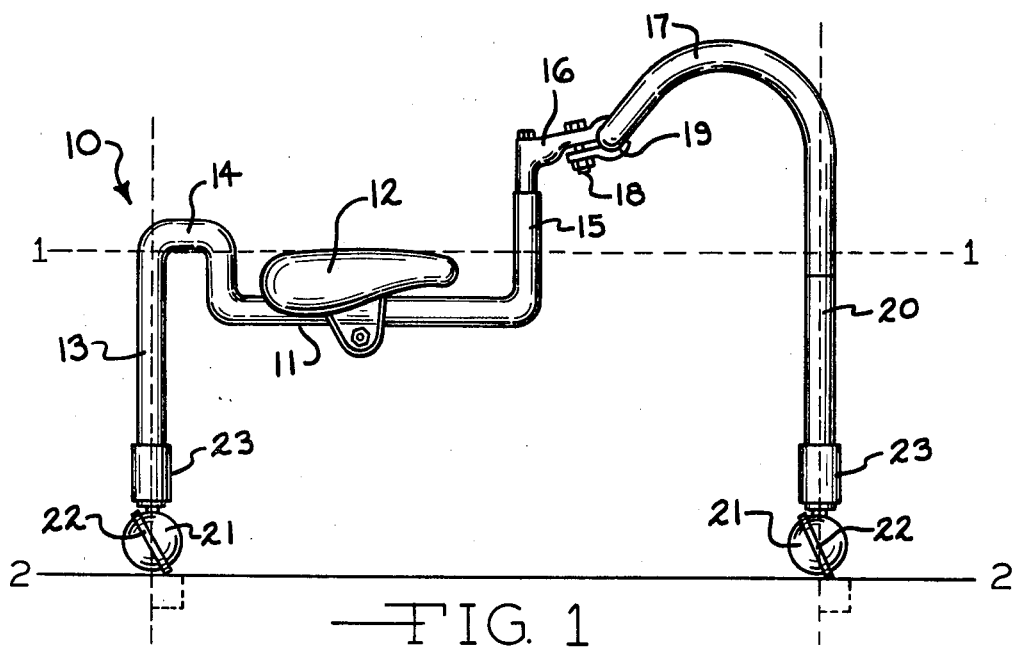
FIG. 1 is a side view of the tripodal vehicle of the present invention particularly illustrating the construction of the legs such that the uppermost portion of the seat is level with or below the uppermost portion of all of the legs.
Figure 2:
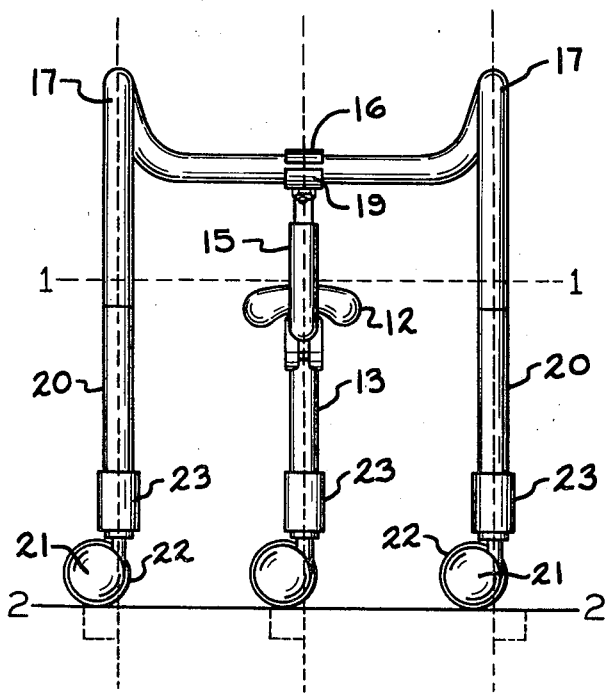
FIG. 2 is a front view of the vehicle of FIG. 1 particularly illustrating the outward spreading of the front legs of the vehicle in relation to the rear leg.

A preferred form of the tripodal vehicle is shown in FIGS. 1 and 2 wherein a frame 10 is formed by a straight tube 11, which supports a seat 12 which can be of the bicycle type which has a tapered front portion as shown in FIG. 1. A single leg 13 is provided perpendicular to the bar 11 and an inverted U-shaped portion 14 is provided between the bar 11 and the leg 13 such that the uppermost part of the portion 14 is slightly above the level of the top of the seat 12 as shown in FIG. 1 by line 1—1 which is parallel to the level plane line 2—2. The U portion 14 can be constructed of various pipe elbows and connectors (not shown) or can be part of a single tube also forming the leg 13 and frame 11 as shown and provides a rigid spring action when the vehicle is in use. The distance between line 2—2 and the uppermost portion 14 is preferably less than the length of the users legs while standing to provide ease of mounting.

The bar 11 in front of the seat 12 is provided with an extension 15 which is perpendicular to the bar 11 and which extends above the level of the seat 12. The extension 15 can be part of a single tube forming the frame or can be constructed of an elbow supporting the extension 15. A first jaw 16 as an attachment means is provided connected to the extension 15 which clamps to handle bars 17 by means of a screw 18 threaded into attachment means 16 which tightens a second jaw 19. The jaws 16 and 19 can be a conventional handle bar clamp as shown in FIG. 1. The handle bars 17 are of the racing bicycle type with two identical legs 20 which extend below the seat preferably perpendicular to the level plane line 2—2 to a length which provides seating when the vehicle is on a level plane. The legs 20 can be a tubular extension of the handle bar 17 or be separately fixed to the handle bar 17 by any convenient means such as rivets (not shown).

Ball casters 21 are provided at the end of the single leg 13 and the two legs 20. The ball casters 21 as shown in FIGS. 1 and 2 with a ring roller 22 which rotates 360° around the ball 21 are preferred since this type easily rolls on carpeting and the like. Flexible bumpers 23 are preferably provided on each of the legs 13 and 20.

Figure 3:
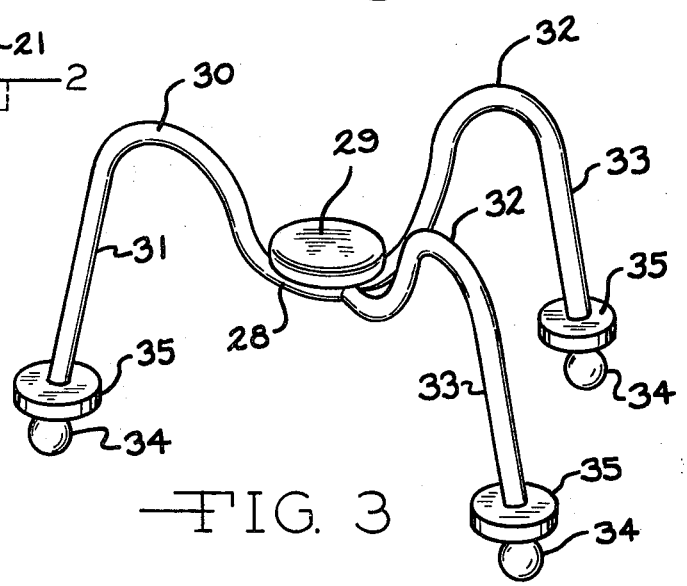
FIG. 3 is a schematic view of a modified version of the vehicle shown in FIGS. 1 and 2 illustrating a generalized spider-like configuration with bumpers which protrude substantially from the sides of the legs mounted on each of the legs adjacent casters.

FIG. 3 schematically illustrates a variation of the tripodal vehicle which more directly shows the spider-like configuration wherein the frame 28 is sway-backed and supports the seat 29. The uppermost rounded portion 30 of the frame 28 behind the seat 29 supports a leg 31. In the front of the seat 29 are two identical rounded portions 32 both of which are above the level of the top of the seat 29 which mount identical legs 33. Each of the legs 31 and 33 are provided with a caster 34 which allows movement of the vehicle by the feet from a rest position in any direction in a level plane when a person is seated on the vehicle. The legs 31 and 33 are splayed slightly outward from a line perpendicular to a level plane. FIG. 3 also shows donut shaped bumpers 35 which project substantially from each of the legs 31 and 33.

Figure 4:
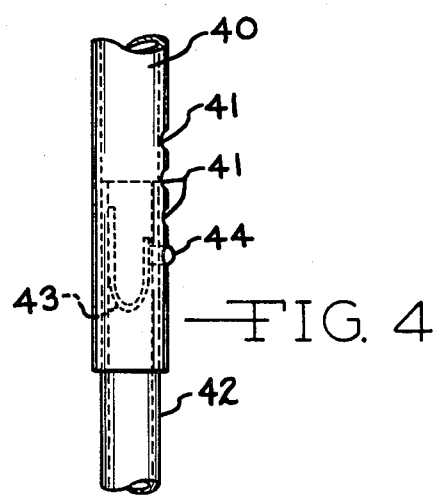
FIG. 4 is a front view of a preferred tubular adjustment means for regulating the length of the legs.

FIG. 4 illustrates one preferred conventional means for adjustment of the length of the front and rear legs of the tripodal vehicle. In particular, a straight outer tubular member 40 is provided with spaced apart holes 41 through the wall parallel to its longitudinal axis corresponding to the length of adjustment. A second tubular member 42 of smaller cross-section is closely fitted inside the outer member 40 such that bending of the tubes 40 and 42 relative to their common longitudinal axes is prevented. Inside the second tubular member 42 is provided a wire spring 43 tensioning a button 44 which protrudes through the wall of the second member 42 and through a selected hole 41 of the larger tubular member 40.

In operation the person sits on the seat on the tripodal vehicle and moves it at will on a level plane by means of the feet. There is complete freedom of movement in the level plane. Most importantly, the vehicle because of its spider-like construction with the seat in the center with its uppermost level below that of the legs is stable against tipping over. The construction is such that the legs provide a rigid spring action when in operation. Vehicles constructed without this feature had a considerably greater tendency to tip over particularly when operated by children.

The term "rigid spring action" as used herein means dynamic flexure of the rounded or U-shaped portions which attach the legs to the frame caused by the weight of the person combined with the movement of the vehicle tends to cause a slight bending of the legs. The legs when constructed so as to be perpendicular to the level plane tend to bend slightly at the rounded portion upon lateral movement away from the direction of movement.

I claim:
1. The tripodal vehicle which comprises:
  a. a straight bar which supports a seat;
  b. said seat, adjustably mounted to said bar;
  c. a single leg positioned adjacent and below the seat substantially at a right angle to the bar and having an inverted U-shaped rigid connection to the bar such that uppermost portion of the U is above the uppermost portion of the seat when the vehicle is on a level plane and provides a rigid spring action, wherein the distance between the U and the level plane is less than the length of the users legs to provide ease of mounting;
  d. attachment means mounted on the bar on the other side of the seat from the single leg, said attachment means including an extension, provided above the seat at right angles to the bar, attached to a handle bar clamp said clamp clamping a horizontal tubular handle bar between two jaws to lock it into a preferred position, said clamp jaws, when released, permitting rotation of said horizontal handle bar about its longitudinal axis;
  e. a horizontal handle bar adjustably connected to the attachment means with two inverted U-shaped portions which are above the uppermost level of the seat and with two legs which extend below the seat to the level plane to a length which provides seating when the vehicle is on a level plane and which provide a rigid spring action; and
  f. casters mounted at the ends of the three legs such that the vehicle is movable by the feet from a rest position in any direction in a level plane when a person is seated on the vehicle.

2. The vehicle of claim 1 wherein the seat is a bicycle seat having a front tapered portion.

3. The vehicle of claim 1 wherein portions of the legs above the casters are provided with a flexible bumper.

4. The vehicle of claim 1 wherein the single leg, handle bar with legs and straight bar are tubular.

5. The vehicle of claim 1 wherein the handle bars are of a tubular racing bicycle type with tubular extensions rigidly attached thereto which form the legs.

* * * * *